United States Patent [19]

Sugita et al.

[11] E Patent Number: Re. 31,893

[45] Reissued Date of Patent: May 21, 1985

[54] SILVER HALIDE COLOR PHOTOGRAPHIC MATERIAL

[75] Inventors: Hiroshi Sugita; Shizuo Saito, both of Hachioji; Ryosuke Sato; Kiyoshi Yamashita, both of Hino, all of Japan

[73] Assignee: Konishiroku Photo Industry Co., Ltd., Tokyo, Japan

[21] Appl. No.: 513,799

[22] Filed: Jul. 14, 1983

Related U.S. Patent Documents

Reissue of:

[64] Patent No.: 4,355,100
Issued: Oct. 19, 1982
Appl. No.: 226,243
Filed: Jan. 19, 1981

[30] Foreign Application Priority Data

Jan. 16, 1980 [JP] Japan ..... 55-3163

[51] Int. Cl.[3] ..... G03C 1/40

[52] U.S. Cl. ..... 430/544; 430/505; 430/553; 430/555; 430/557; 430/558; 430/957

[58] Field of Search ..... 430/505, 544, 553, 555, 430/557, 558, 957

[56] References Cited

U.S. PATENT DOCUMENTS

| | | | |
|---|---|---|---|
| 3,227,554 | 1/1966 | Barr et al. | 430/555 |
| 3,379,529 | 4/1968 | Porter et al. | 430/566 |
| 3,615,506 | 10/1971 | Abbott et al. | 430/555 |
| 3,632,345 | 1/1972 | Marx et al. | 430/543 |
| 3,652,278 | 3/1972 | Asano et al. | 430/551 |
| 3,811,891 | 5/1974 | Dariak et al. | 430/505 |
| 3,928,041 | 12/1975 | Fujiwhara et al. | 430/505 |
| 3,933,500 | 1/1976 | Shiba et al. | 430/554 |
| 3,938,996 | 2/1976 | Fujiwhara et al. | 430/957 |
| 3,958,993 | 5/1976 | Fujiwhara et al. | 430/505 |
| 3,961,959 | 6/1976 | Fujiwhara et al. | 430/957 |
| 4,015,988 | 4/1977 | Shiba et al. | 430/505 |
| 4,046,574 | 9/1977 | Odenwalder et al. | 430/544 |
| 4,052,213 | 10/1977 | Credner et al. | 430/544 |
| 4,063,950 | 12/1977 | Fujiwhara et al. | 430/505 |
| 4,095,984 | 6/1978 | Sueyoshi et al. | 430/544 |
| 4,149,886 | 4/1979 | Tanaka et al. | 430/558 |
| 4,187,110 | 2/1980 | Yagihara et al. | 430/957 |
| 4,250,252 | 1/1981 | Odenwalder et al. | 430/957 |
| 4,286,054 | 8/1981 | Engelmann et al. | 430/544 |

*Primary Examiner*—J. Travis Brown
*Attorney, Agent, or Firm*—Finnegan, Henderson, Farabow, Garrett and Dunner

[57] ABSTRACT

A color photographic material having a light-sensitive silver halide emulsion layer containing a DIR compound having an amino group and a DIR compound having no amino group.

6 Claims, No Drawings

SILVER HALIDE COLOR PHOTOGRAPHIC MATERIAL

Matter enclosed in heavy brackets [ ] appears in the original patent but forms no part of this reissue specification; matter printed in italics indicates the additions made by reissue.

The present invention relates to a silver halide color photographic material, and more specifically to the one that is improved not only in photographic performances, such as the graininess, sharpness and color reproducibility of color images but in such a way that even if it is exposed to formaldehyde gas before the color development its ultimate photographic performances are little affected.

The silver halide color photographic material containing a compound that releases a development inhibitor whose amount is corresponding to the density of the image at the time of development (hereinafter the compound is called "DIR compound") is well known.

This DIR compound is generally of a type that reacts with an oxidation product of an aromatic primary amine developing agent to release a development inhibitor. Typically, compounds prepared by introducing at the active site of the molecule of a coupler a group that can form a development inhibitor as it is released from the parent compound are known as disclosed, for example, in British Pat. No. 953,454, U.S. Pat. Nos. 3,227,554, 4,095,984, and 4,149,886. These compounds have such a property that when they undergo a coupling reaction with an oxidation product of an aromatic primary amine developing agent, they release a development inhibitor while the parent coupler molecule forms a dye.

Further, as disclosed in U.S. Pat. Nos. 3,632,345, 3,928,041, 3,958,993, 3,961,959 and 4,052,213, and Japanese (hereinafter referred to as "Japanese Patent O.P.I. Publication") Patent Publication Open to Public Inspection/Nos. 110,529/1978 and 13,333/1979, and Japanese Patent Application No. 69,244/1979, compounds are known which release a development inhibitor but does not form any dye when they undergo a coupling reaction with an oxidation product of an aromatic primary amine developing agent.

Further, as disclosed in U.S. Pat. Nos. 3,379,529 and 3,930,863, so-called DIR hydroquinones or compounds that undergo a reduction-oxidation reaction with an oxidation product of a developing agent to release a development inhibitor are known.

These DIR compounds are generally used for purposes as described below. Namely, they are characterized by a capability of releasing a development inhibitor in accordance to the darkness of the image being developed and the released development inhibitor is expected to have two image effects, or the so-called intra-image effect and inter-image effect; in the layer where the development inhibitor is released, if it is a layer of photosensitive emulsion, the development is inhibited in accordance to the darkness of the image being developed to give the intra-image effect including the proper tone control, finer grain development and more sharpness of image, while diffusing into other layer or layers in case of the color photographic material, the development inhibitor gives the inter image effect including the mask effect, which appears because it inhibits the development there in accordance to the darkness of the image in the layer that is the source of its diffusion, and the improved coloring performance, which is based on the inhibition of the development in other layer or layers in case of the mono-color exposure and the like. Thus, the DIR compounds are primarily used for these two image effects given by the released development inhibitor. About this point, a detailed description is given in a paper "Development inhibitor releasing (DIR) couplers in color photography" published in "Photographic Science and Engineering", Vol. 13, p. 74 (1969).

However, among the above three types of DIR compounds, the DIR hydroquinone compounds are poorly reactive with the oxidation product of aromatic primary amine developing agents, so they must be used in a large quantity in order to give the photosensitive material the desirable image effects enough. Further, being used in a large quantity, they lower the sensitivity much and make the time-dependent keeping quality poor, adversely affecting the photographic performances very much. Therefore, this type of compounds are of very slight use. By contrast, the other two types of compounds that undergo a coupling reaction with an oxidation product of an aromatic primary amine developing agent are superior in reactivity, so thay can give the desirable image effects to the photographic material in a much smaller dosis than the DIR hydroquinone compounds.

U.S. Pat. No. 4,015,988 disclosed an art to control the intra and inter image effects by the combined use of two or more DIR compound types that release as a result of a reaction with the oxidation product of the aromatic primary amine developing agent development inhibitors that differ in diffusivity in the layer of sensitive emulsion while the British Pat. No. 1,536,341 disclosed an art to control the graduation by the combined use of two DIR compound types that differ in the reactivity with the oxidation product of the aromatic primary amine developing agent.

However, though these types of compounds or combination thereof are effective in improving the photographic performances in the graininess, sharpness or color reproducibility through the image effects as above mentioned, it has been found that the silver halide color photographic material containing one of these DIR compounds deteriorates remarkably in its photographic performances when it is exposed to formaldehyde gas during its storage bebore color development.

In recent years, as new building materials, new furniture, resin products, adhesives, clothes of artificial fiber, and the like, namely, materials that can emit harmful gases such as formaldehyde are frequently used in daily life, the photographic material has a frequent danger of being exposed to a harmful gas. Thus, particularly, in case of the internal development type silver halide color photographic material containing a coupler, it is known that if the material should be placed in an atmosphere of formaldehyde gas before it is subjected to the color development process, there appears serious deterioration in photographic performances, such as poor color development, lowered gamma, color contamination, and/or more fogging. A factor responsible for such failure is considered to be a reaction of the coupler with formaldehyde gas.

In case such silver halide color photographic material is loaded with a DIR compound to improve its photographic performances in graininess, sharpness, color reproducibity, or the like, its contact with formaldehyde gas deteriorates its photographic performances in the sensitivity, color development, etc. more remarkably. Thus, an improvement at this point is highly desired.

As an art to prevent the deterioration of photographic performances as caused by the contact with a harmful gas such as formaldehyde, it has been known to load the silver halide color photographic material with one of compounds capable of reacting with formaldehyde as disclosed in U.S. Pat. Nos. 3,652,278 and 3,811,891, and Japanese Patent Pulication No. 23908/1976. However, being generally comparatively less reactive with formaldehyde, the compounds of prior art have such demerits that in order to give full effects they must be added in a large quantity and when used in a large quantity they deteriorate the physical properties of the membrane of the photographic material. Thus, many of them affect the photographic performances adversely. Further, the compounds of prior art have a significant weak point that they are ineffective to formaldehyde in excess of their quantity added to the silver halide color photographic material.

Therefore, it is the primary object of the present invention to provide a silver halide color photographic material that is improved in its performances in the graininess, sharpness and color reproducibility.

It is another object of the present invention to provide a silver halide color photographic material that is free from deterioration in photographic performances, such as the poor color development, lowered gamma and sensitivity, color contamination, and more fogging, even when exposed to formaldehyde gas for a prolonged duraction of time during storage before the color development process.

It is still another object of the present invention to provide a multi-layer silver halide color photographic material that maintains the color balance even when exposed to formaldehyde gas for a prolonged duraction of time during storage before the color development process.

The color photographic material of the present invention contains two species of DIR compounds which release a diffusible development inhibiting compounds by coupling reaction with the oxidation product of the aromatic primary amine developing agent, in a silver halide emulsion layer or an adjacent layer to the silver halide emulsion layer coated on a support, wherein one spiecies of DIR compound releases a development-inhibiting substance having an amino group (which is called as DIR compound (I)) and the another species releases a development-inhibiting substance having no amino group (which is called as DIR compound (II) in this specification).

The DIR compound (I) and DIR compound (II) are more specifically described by the formula (I) and (II) respectively:

$$C_p\text{-}Z_1 \quad \text{(I)}$$

$$C_p\text{-}Z_2 \quad \text{(II)}$$

In the formulae $C_p$ is a coupler residue, being capable of coupling with an oxidation product of an aromatic primary amine developing agent, $Z_1$ is a residue which is released to be a diffusive development-inhibiting substance having an amino group, by coupling reaction with the oxidation product of the aromatic primary amine developing agent, $Z_2$ is a residue which is released to be a diffusive development-inhibiting substance having no amino group, by coupling reaction with the oxidation product of the aromatic primary amine developing agent.

In the preferred embodiment of the present invention, $Z_1$ is represented by

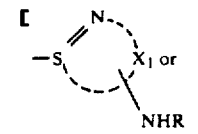

(III)

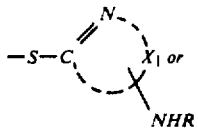

*(III)*

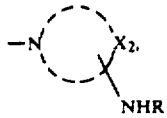

(IV)

and $Z_2$ is represented by

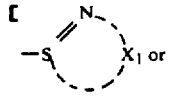

(V)

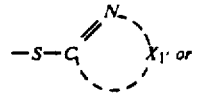

*(IV)*

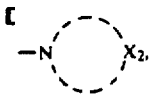

(VI)

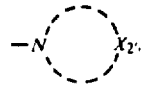

*(VI)* wherein $X_1$ is a 5 or 6 membered heterocycle containing a nitrogen, oxygen or sulfur, and [has] *having* no [other] amino group *other than* that described in [formulae] *formula* (III) [or (IV)], *$X_1'$ is a 5 or 6 membered heterocycle containing a nitrogen, oxygen or sulfur and having no amino group*, $X_2$ is a 5 membered heterocycle containing two nitrogen atoms *and* having no [other] amino group *other than* that described in the formula [(III) or] (IV), *$X_2'$ is a 5 membered heterocycle containing two nitrogen atoms and having no amino group*, and R is hydrogen, alkyl, aryl or heterocycle.

More preferably $Z_1$ is represented by the above formula (III) and $Z_2$ is represented by the formula (V). Hydrogen is preferable for R.

The amino group cited above includes a primary amino group or a secondary amino group having an alkyl, aryl or heterocycle as its substituent. In case of the secondary amino group, as a substituent thereof, an alkyl group is preferably contains up to 18 carbon atoms and may be a saturated or unsaturated, or straight or branched chain. Example thereof includes the methyl, ethyl, isopropyl, dodecyl, or octenyl group being cited. The above category of alkyl groups also include the alicyclic groups, such as the cyclohexyl group. Further, these alkyl groups may have as a substituent or substituents the alkoxy group, such as methoxy or isopropoxy group, halogen atom, such as chlorine or bromine, hydroxy group, carboxy group, sulfo group, heterocyclic group, such as tetrahydrofuranyl or pyridyl group, aryl group, such as phenyl or tolyl group, or the like.

An aryl group, as the substituent of the secondary amino group, is a phenyl or naphthyl group. These aryl groups may have various types of substituents as above cited for the alkyl groups. Further, they may also have as a substituent or substituents the cyano, nitro or amino group.

A heterocycle, as the substituent of the secondary amino group, is preferably a 5- or 6-membered ring one containing an oxygen, nitrogen or sulfur atom. The heterocyclic group may have various types of substituents as above cited for the aryl groups.

Particularly, preferable for $Z_1$ is amino-substituted tetrazolyl, thiadiazolyl, oxadiazolyl, thiazolyl, oxazolyl, imidazolyl or triazolyl group, more specific example of which is 1-phenyltetrazolyl, 1,3,4-thiadiazolyl, 1,3,4-oxadiazolyl, benzthiazolyl, benzoxazolyl, benzimidazolyl, 4H-1,2,4-triazolyl group.

Cp is a coupler residue and can be selected from, for example, residues of dye-forming or non-dye-forming 4-equivalent couplers which are used in silver halide photographic materials. Some examples of the said 4-equivalent couplers are stated hereinafter.

As a result of our extensive study, according to the present invention, large image effects can be achieved with the silver halide color photographic material while its deterioration in photographic performances that may otherwise occur when it is stored under exposure to formaldehyde gas for a prolonged period of time before the color development process can be markedly prevented.

Namely, the present invention is based on the following findings. The DIR compound is widely used for improvements in graininess, sharpness and color reproducibility of the high-sensitive silver halide color photographic material. In case the photographic material contains a DIR compound or compounds that belong to the DIR compound (II) only, however, we found that if the photographic material is stored under exposure to formaldehyde gas before the color development process, the DIR compound or compounds in the photographic material partially decomposes and releases a development inhibitor in the material to markedly deteriorate that material in its photographic performances, for example, resulting in a lowered sensitivity and poor dye density.

These disadvantages are removed by making use of the DIR compound (I) in combination with the DIR compound (II).

For a multi-layer color photographic material having layers of silver halide emulsion individually sensitive to the blue, green and red lights, the color balance between the three sensitive layers must be preserved for the color reproduction. In case DIR compounds are not combined according to the present invention, the three sensitive layers deteriorate not always uniformly in their photographic performances under contact with formaldehyde gas for a prolonged period of time before the color development process, so the color reproduction then becomes very difficult. With a combination of DIR compounds according to the present invention, however, changes in the color photographic performances in the three layers under contact with formaldehyde gas can be individually controlled and, therefore, it becomes very easy to preserve the color balance. Thus, the present invention also provides an effective means for the preservation of the color balance in the multi-layer color photographic material. The above point will be understood more fully in the description of examples given later.

Thus, a preferred embodiment of the present invention is a silver halide color photographic material composed of a plurality of layers of silver halide emulsion, sensitive to different spectral ranges, formed on a base with a combination of DIR compounds (I) and (II) contained at least in one of these layers of silver halide emulsion or layers of hydrophilic colloid solution adjacent thereto.

Specific examples of the DIR compounds of the groups I and II that are used in the silver halide color photographic material of the present intention will be cited below.

DIR compound I

D-1

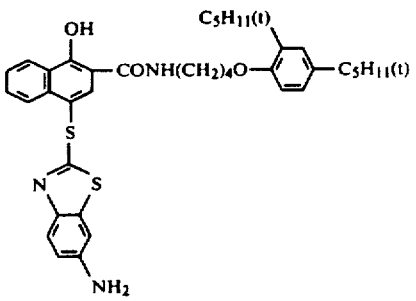

D-2

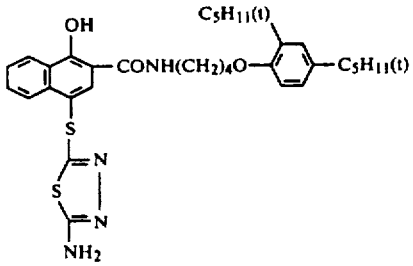

-continued
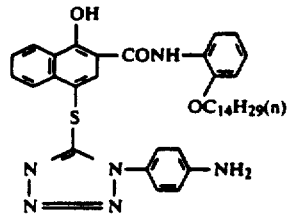
D-3
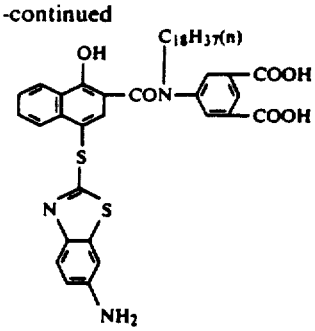
D-4
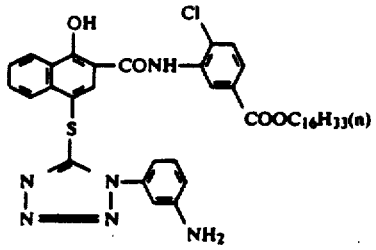
D-5
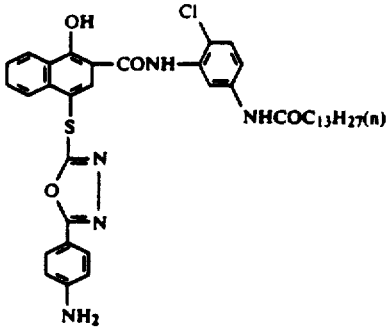
D-6
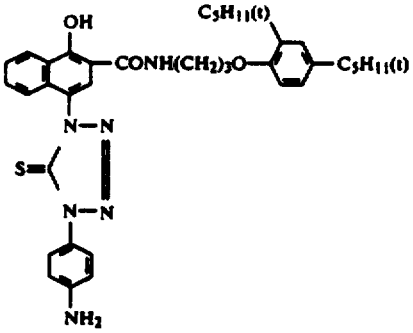
D-7
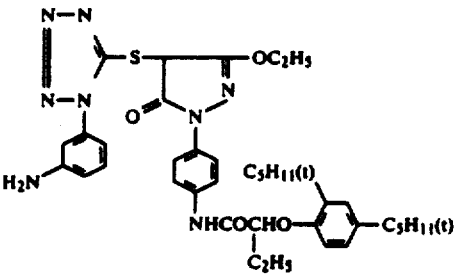
D-8
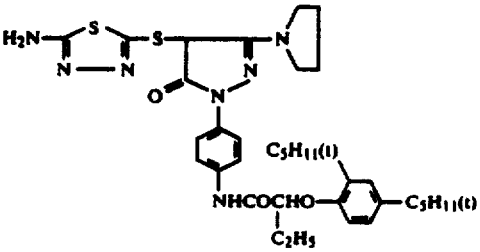
D-9
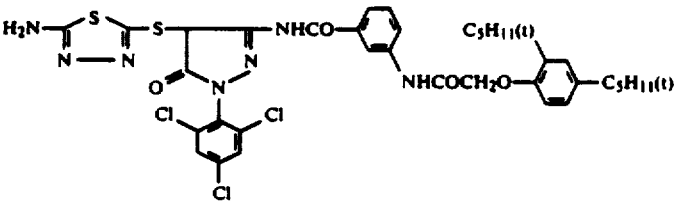
D-10

-continued
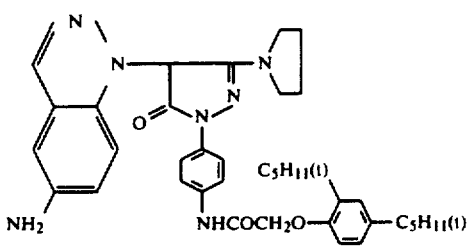
D-11
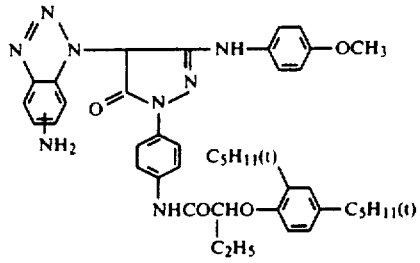
D-12
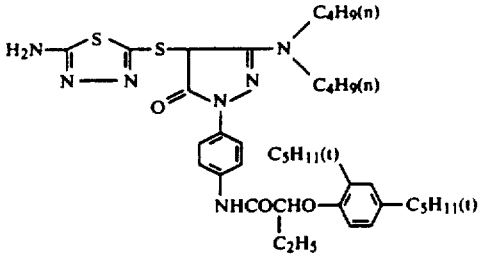
D-13
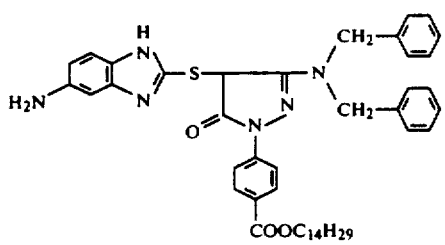
D-14
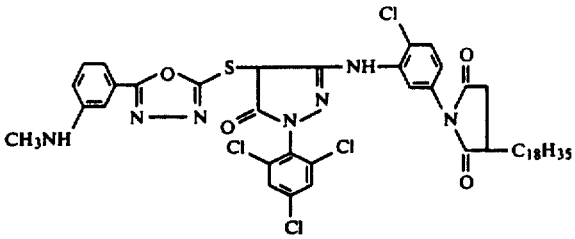
D-15
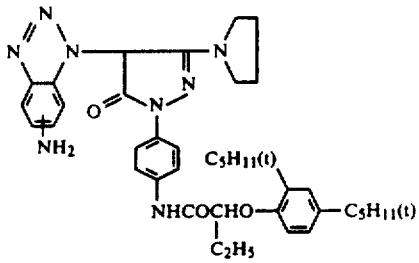
D-16
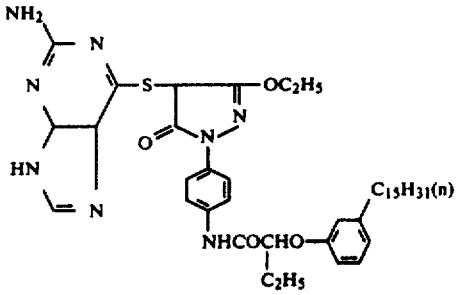
D-17
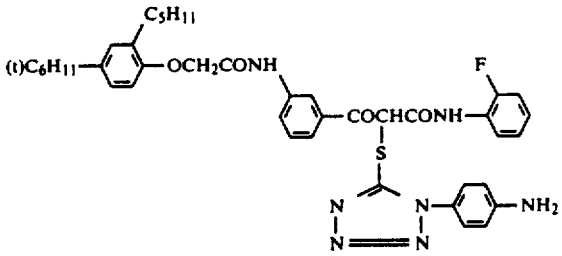
D-18
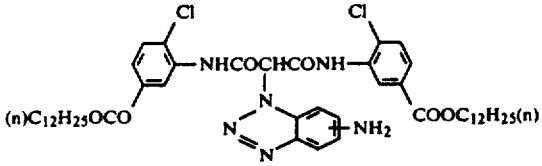
D-19
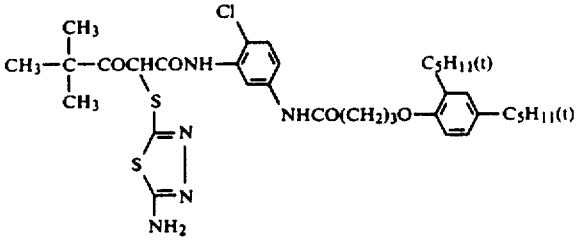
D-20

-continued
D-21
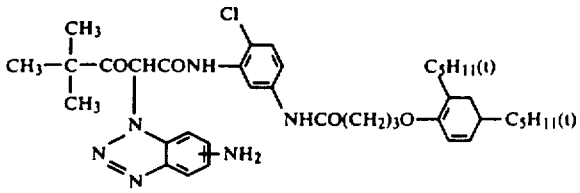
D-22
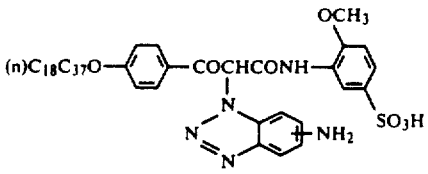
D-23
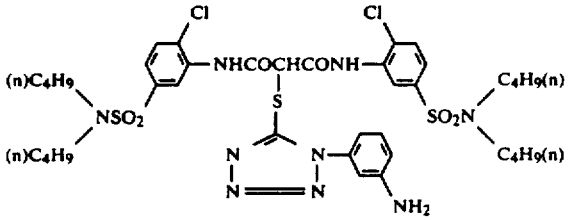
D-24
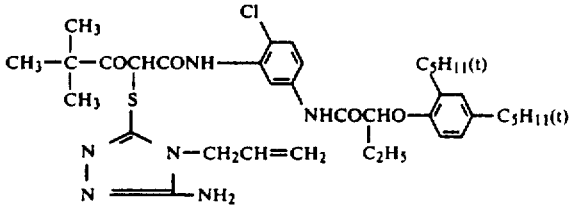
D-25
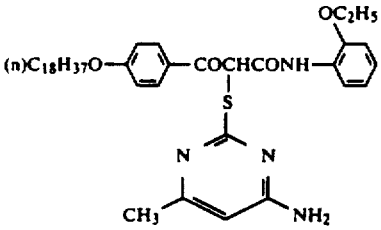
D-26
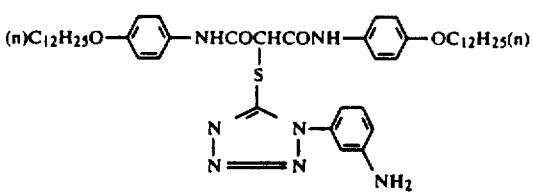
D-27
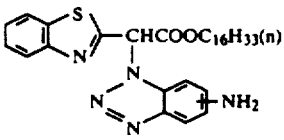
D-28
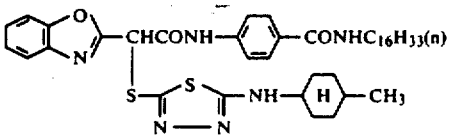
D-29
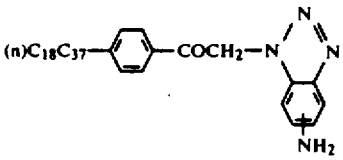
D-30
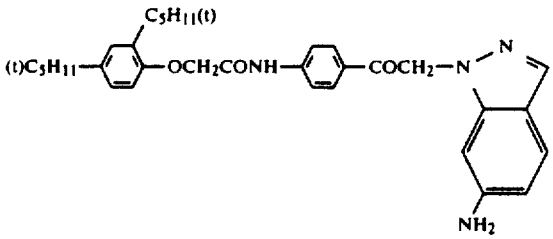
D-31
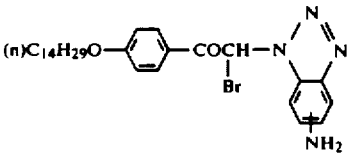
D-32
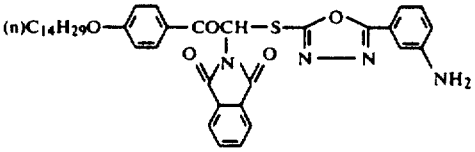

-continued
D-33
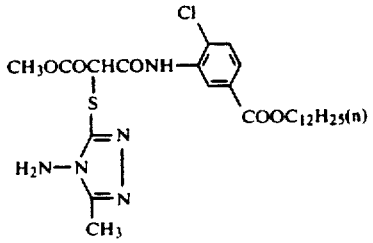
D-34
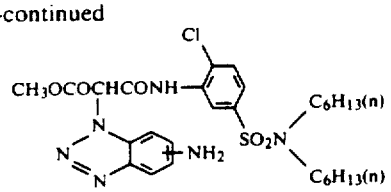
D-35
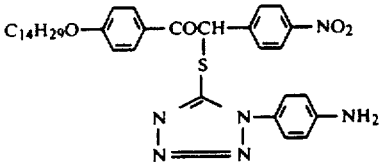
D-36
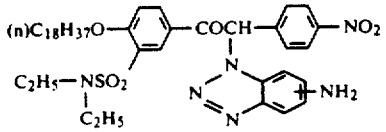
D-37
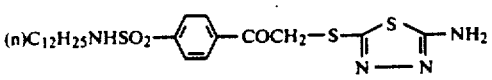
D-38
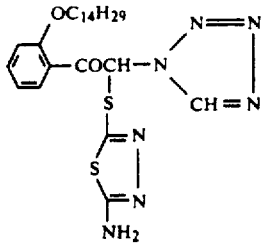
D-39
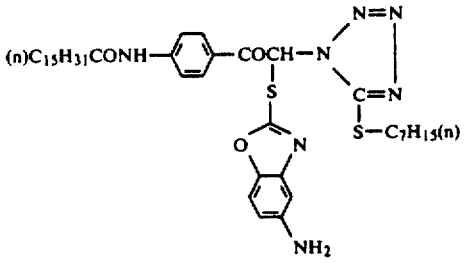
D-40
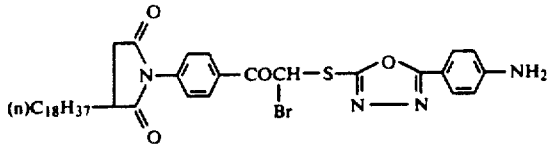
D-41
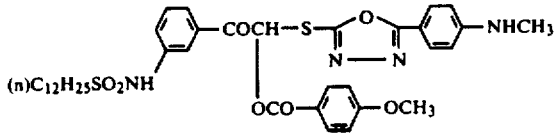
D-42
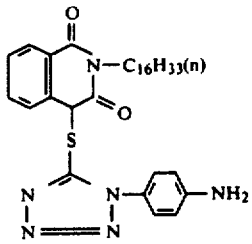
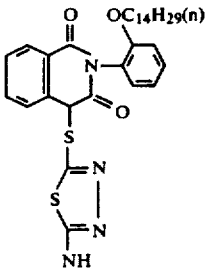
D-43
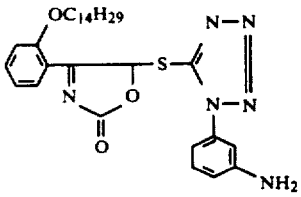
D-44

-continued
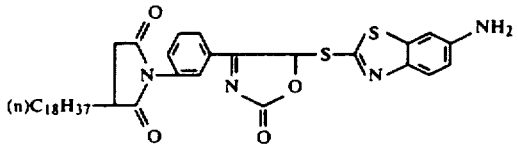
D-45
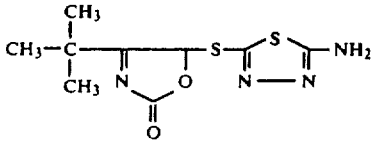
D-46
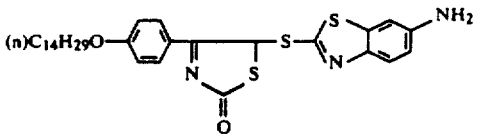
D-47
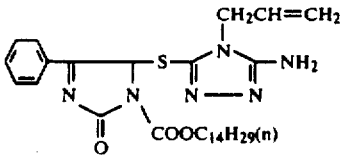
D-48
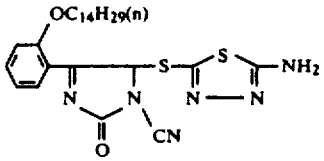
D-49
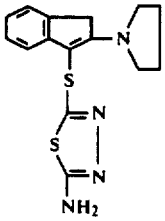
D-50
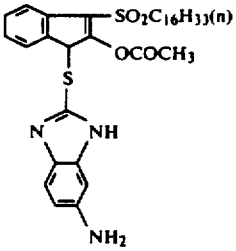
D-51
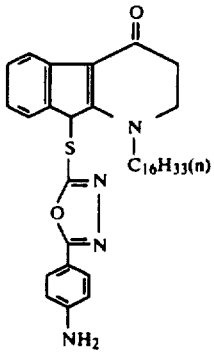
D-52
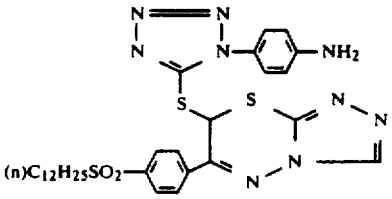
D-53
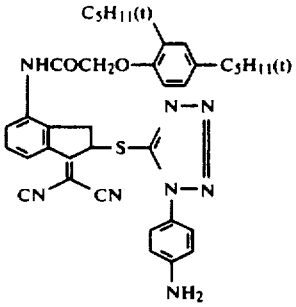
D-54

-continued
D-55
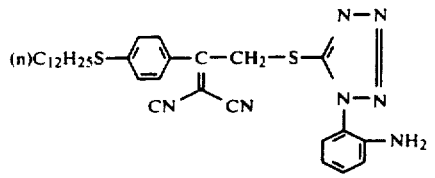
D-56
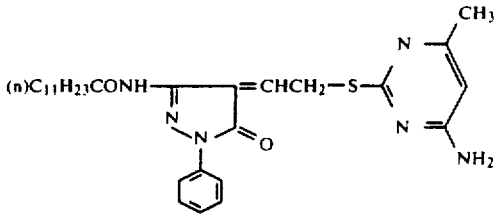
D-57
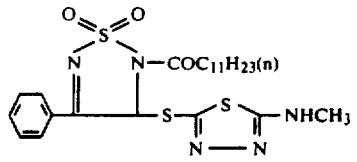
D-58
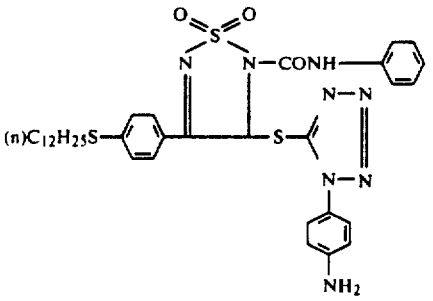
D-59
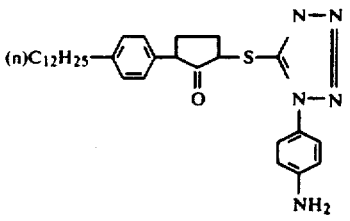
D-60
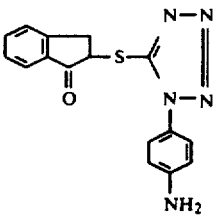
D-61
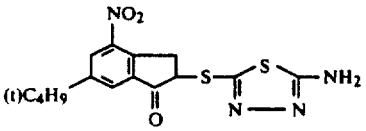
D-62
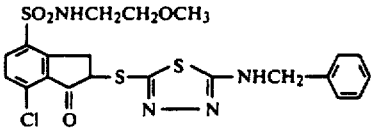
D-63
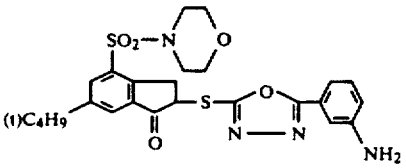
D-64
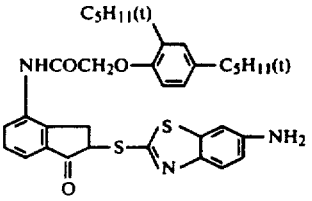
D-65
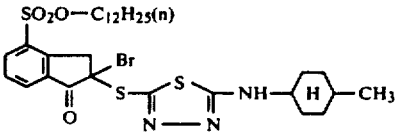
D-66
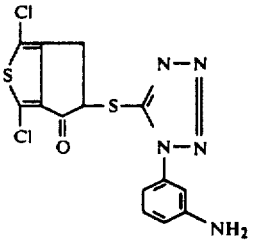

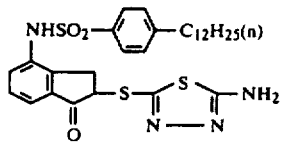
-continued
D-67
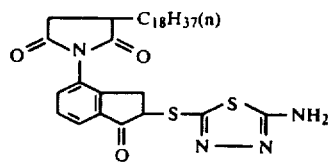
D-68
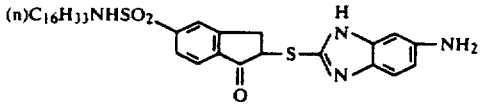
D-69
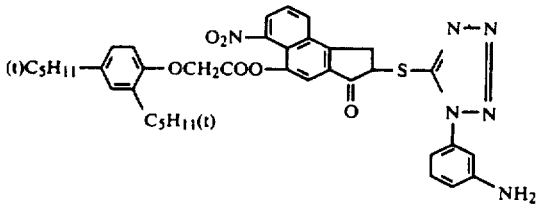
D-70
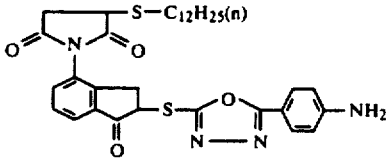
D-71
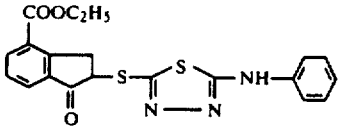
D-72
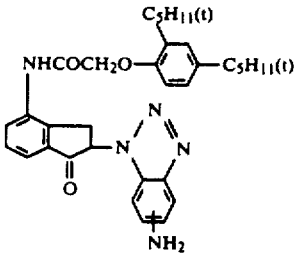
D-73
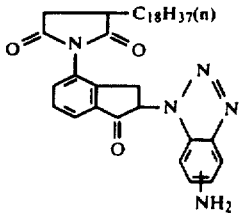
D-74
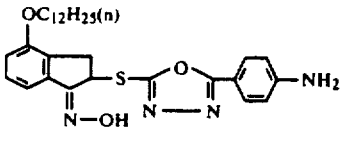
D-75
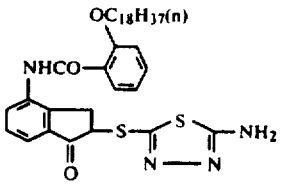
D-76
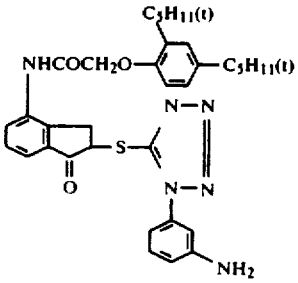
D-77
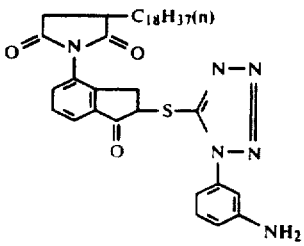
D-78

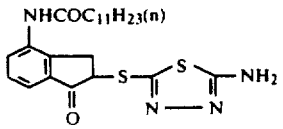
-continued
D-79
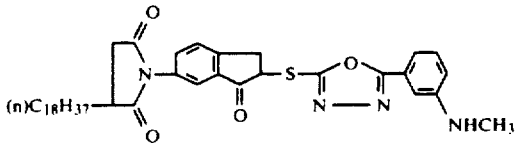
D-80
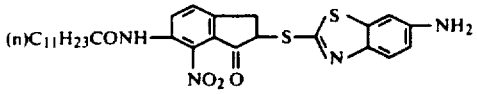
D-81
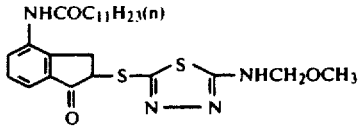
D-82
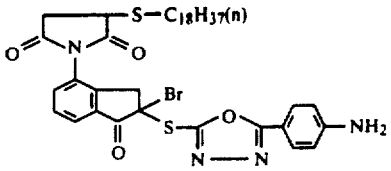
D-83
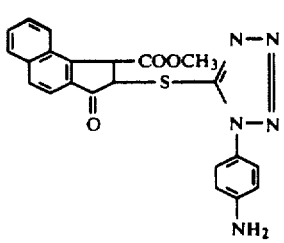
D-84
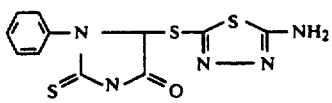
D-85
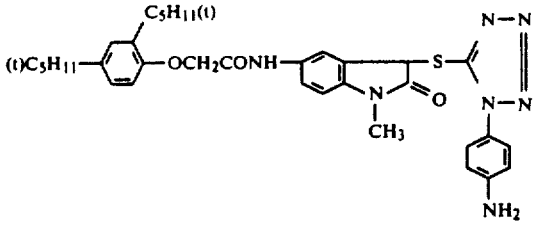
D-86
DIR Compound II
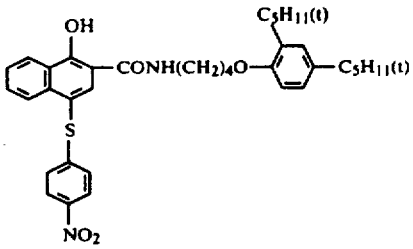
D-87
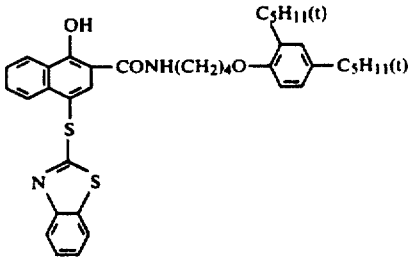
D-88
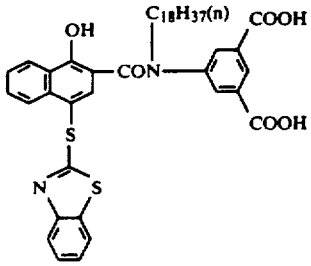
D-89
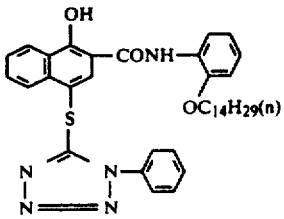
D-90

-continued
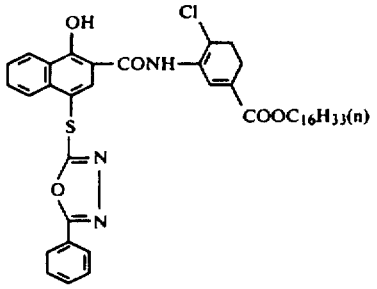
D-91
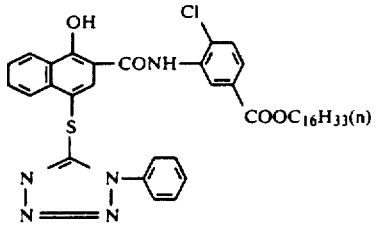
D-92
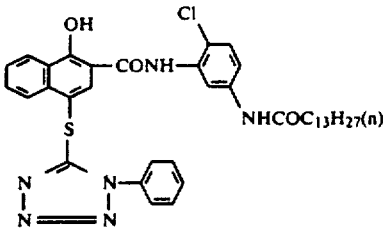
D-93
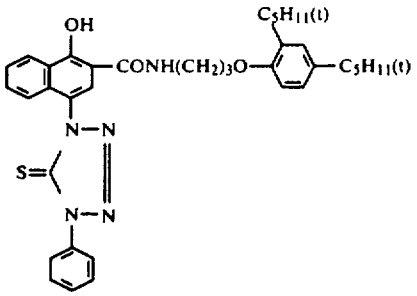
D-94
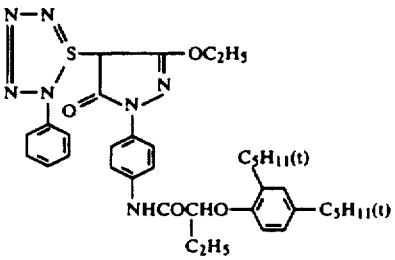
D-95
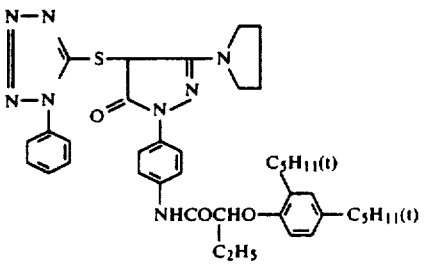
D-96
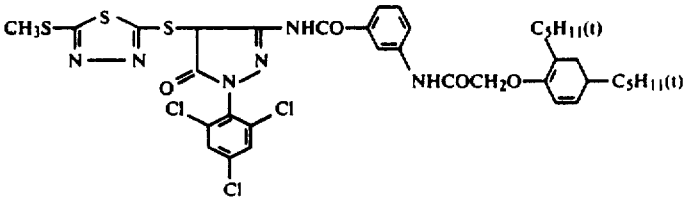
D-97
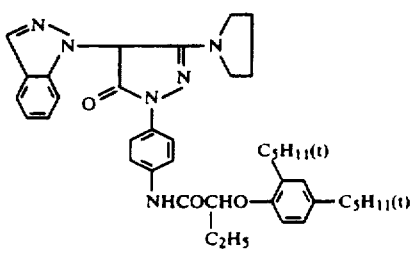
D-98
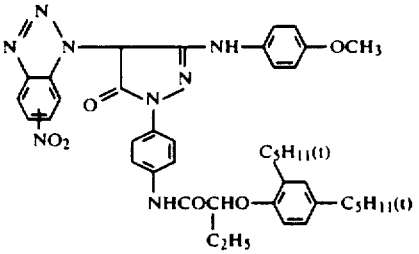
D-99

-continued
D-100
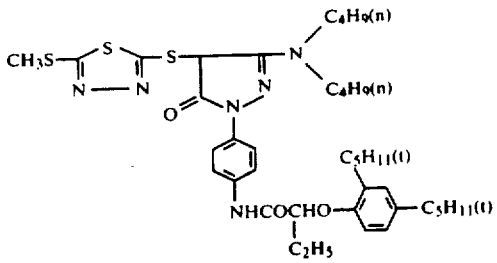
D-101
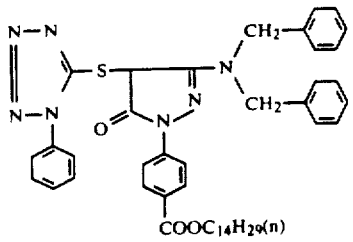
D-102
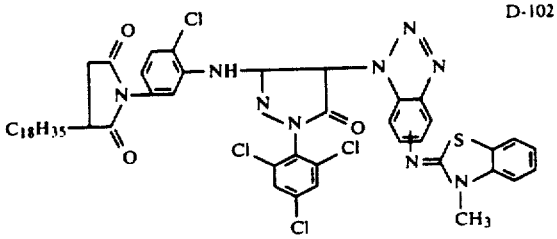
D-103
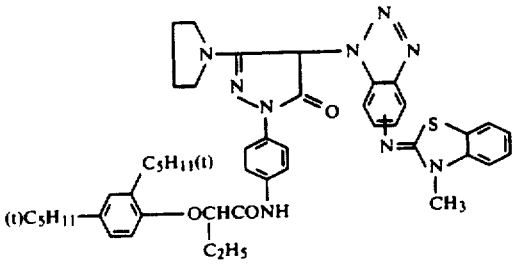
D-104
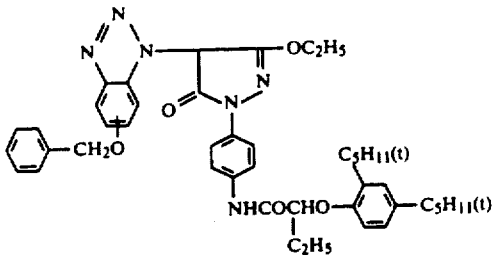
D-105
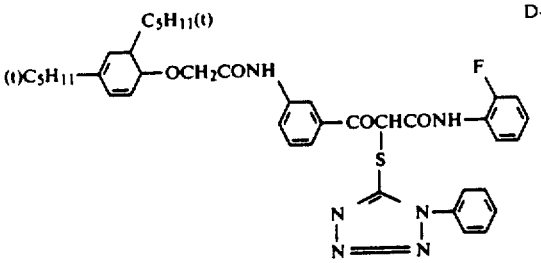
D-106
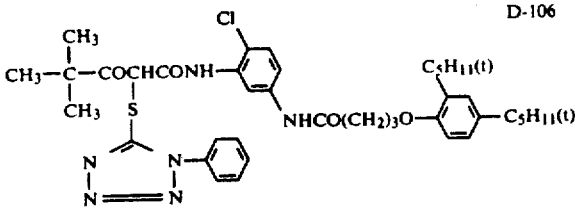
D-107
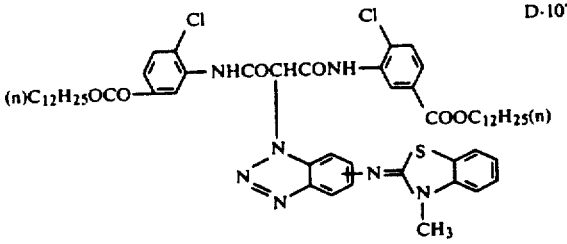
D-108
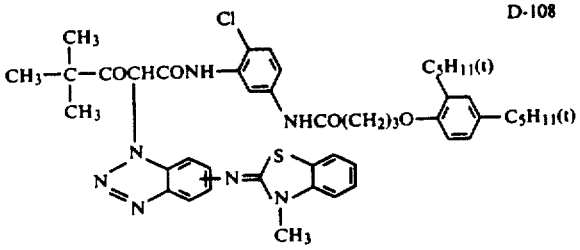
D-109
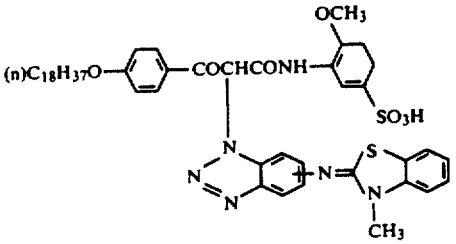

-continued
D-110
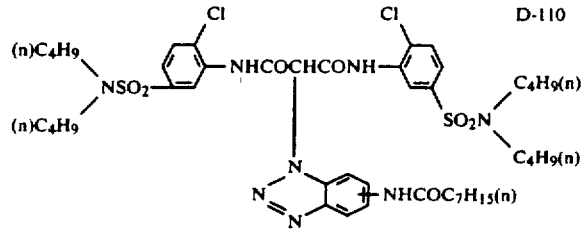
D-111
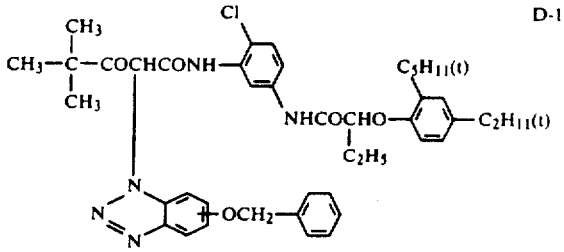
D-112
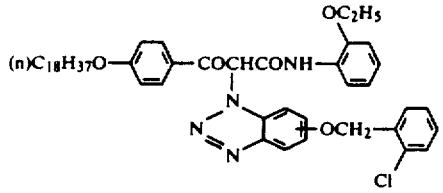
D-113
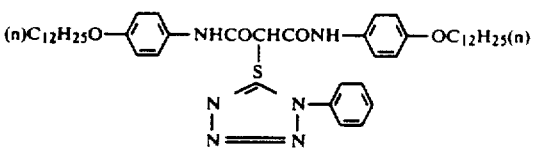
D-114
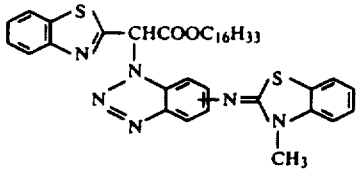
D-115
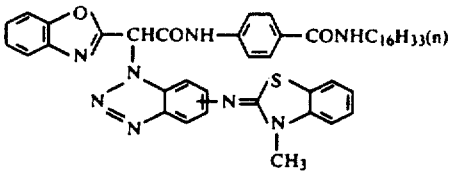
D-116
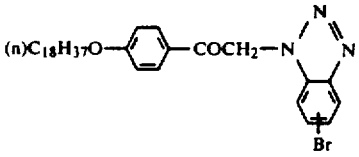
D-117
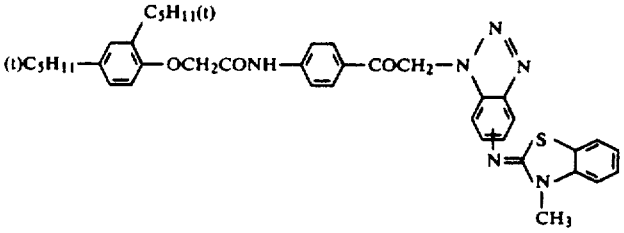
D-118
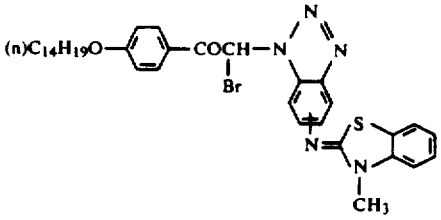
D-119
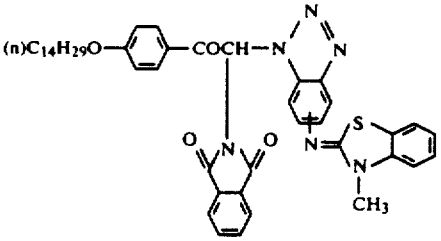
D-120
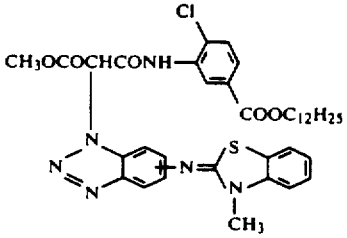
D-121
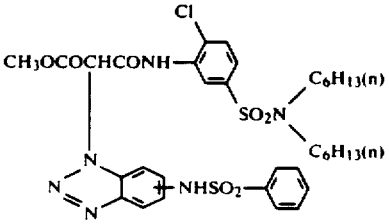

-continued
D-122
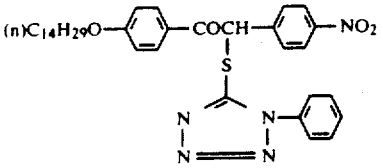
D-123
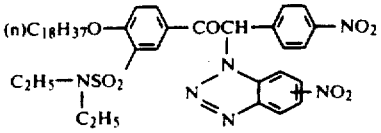
D-124
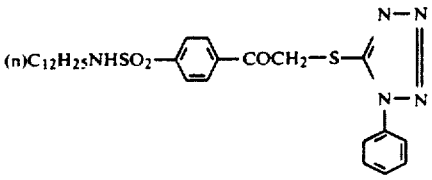
D-125
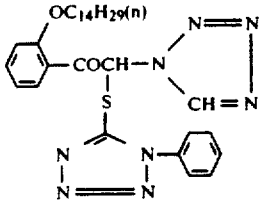
D-126
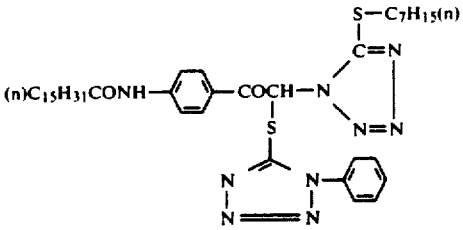
D-127
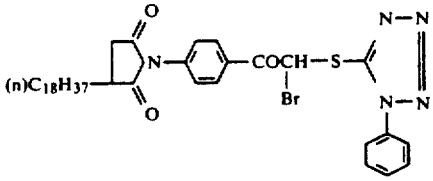
D-128
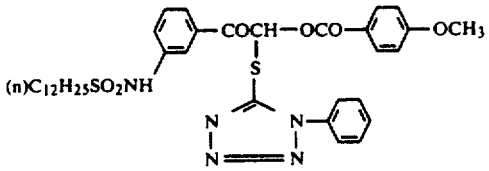
D-129
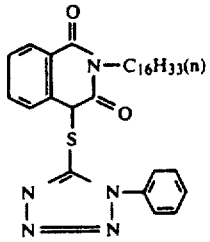
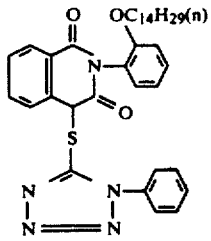
D-130
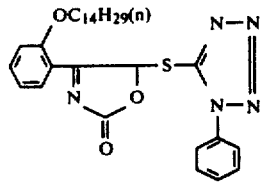
D-131
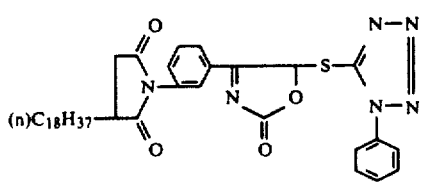
D-132
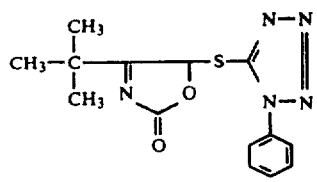
D-133

-continued
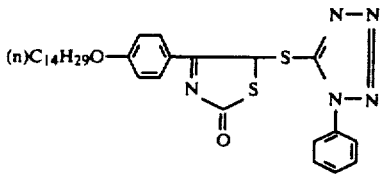
D-134
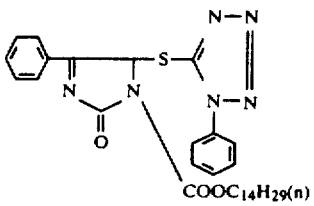
D-135
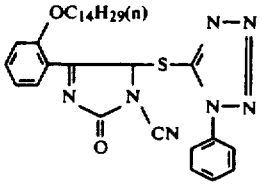
D-136
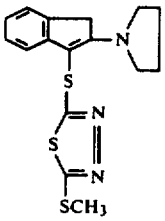
D-137
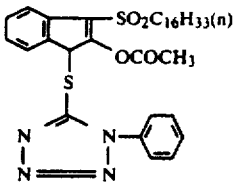
D-138
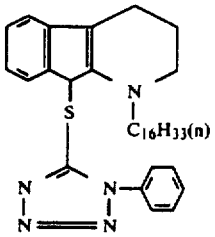
D-139
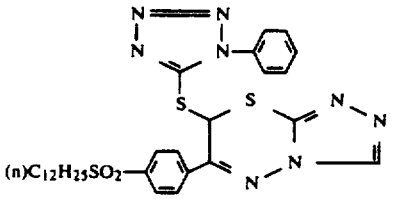
D-140
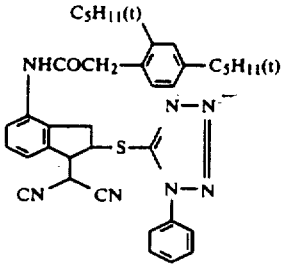
D-141
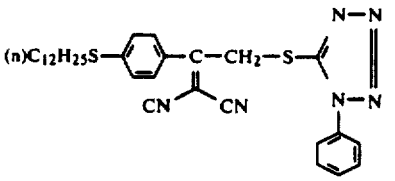
D-142
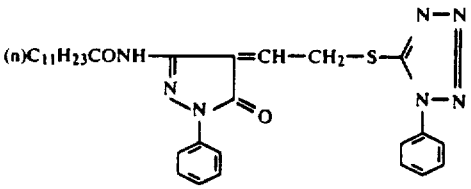
D-143
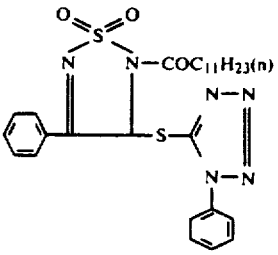
D-144
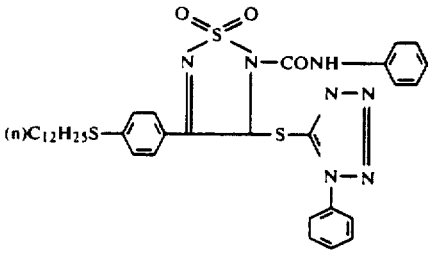
D-145

-continued
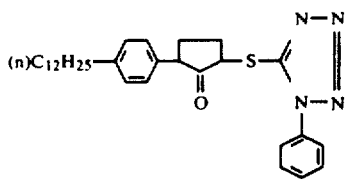
D-146
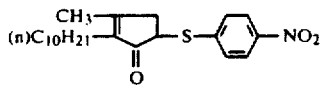
D-147
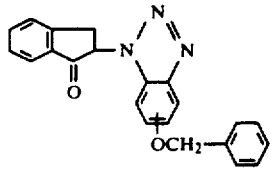
D-148
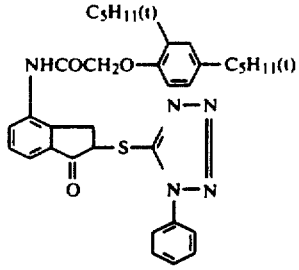
D-149
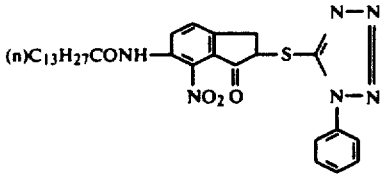
D-150
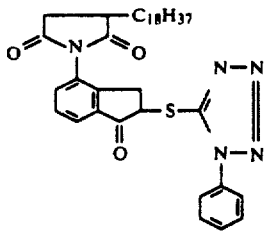
D-151
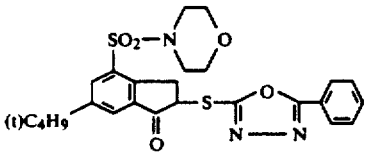
D-152
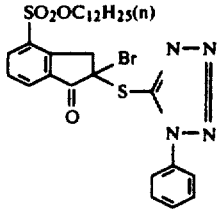
D-153
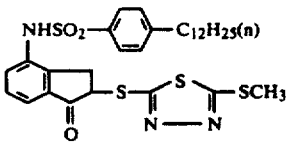
D-154
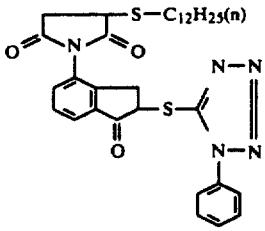
D-155
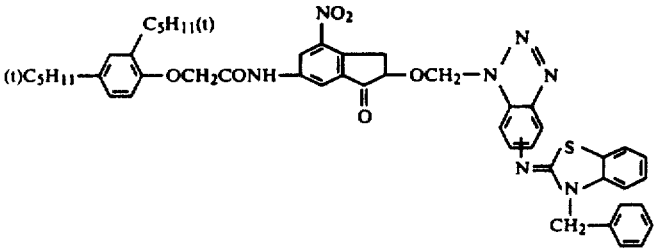
D-156

-continued
D-157
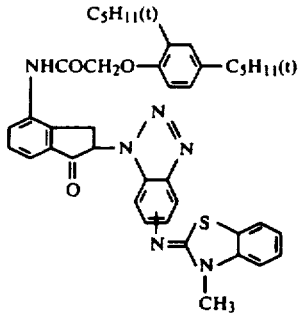
D-158
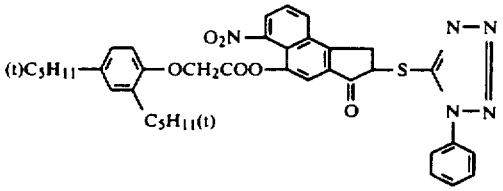
D-159
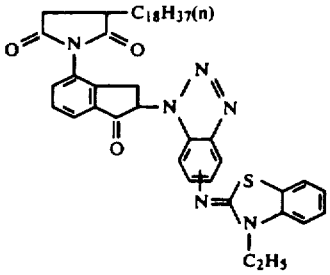
D-160
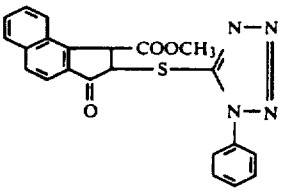
D-161
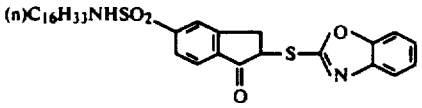
D-162
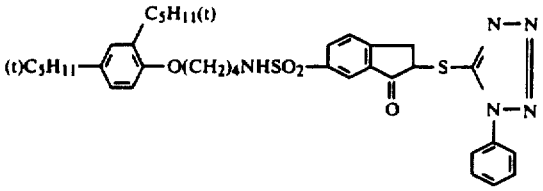
D-163
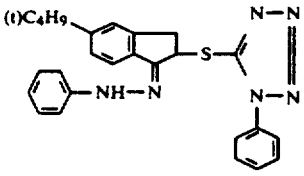
D-164
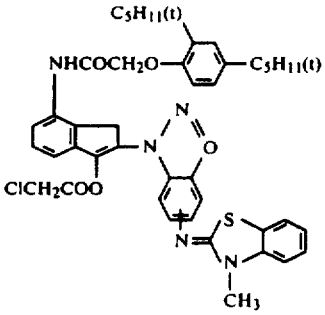
D-165
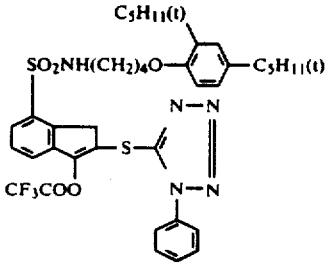
D-166
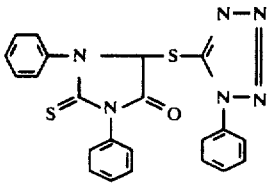

-continued

D-167

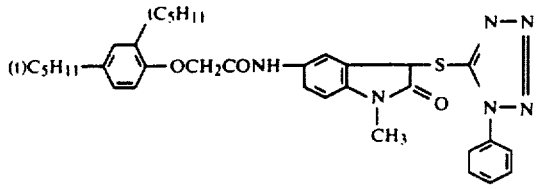

Compounds of the DIR compound groups I and II of the present invention (hereinafter called "DIR compounds of the present invention") can be synthesized by the methods as described in U.S. Pat. Nos. 3,227,554, 3,615,506, 3,632,345, 3,928,041, 3,933,500, 3,938,996, 3,958,993, 3,961,959, 4,046,574, 4,052,213, 4,063,950, 4,095,984, and 4,149,886, Japanese Patent O.P.I. Publication Nos. 81,144/1975, 81,145/1975, 13,239/1976, 64,927/1976, 104,825/1976, 105,819/1976, 65,433/1977, 82,423/1977, 117,627/1977, 130,327/1977, 154,631/1977, 7,232/1978, 9,116/1978, 29,717/1978, 70,821/1978, 103,472/1978, 110,529/1978, 135,333/1978, 143,223/1978, 13,333/1979, 49,138/1979, 114,241/1979, etc.

The present invention can be applied to various silver halide color photographic materials, for example, those for general color photography, color X-ray and diffusion transfer type color photography, when these materials can be used in combination with known two or four equivalent couplers. For the yellow coupler used in the present invention, open chain ketomethylene couplers can be applied, among which benzoylacetanilide type and pivaloylacetanilide type yellow couplers are preferable for use. Examples of the applicable yellow coupler are given in U.S. Pat. Nos. 2,875,057, 3,265,506, 3,277,155, 3,408,194, 3,415,652, 3,447,928, 3,664,841, Japanese Patent Examined Publication No. 13,576/1974, Japanese Patent O.P.I. Publication Nos. 29,432/1973, 66,834/1973, 10,736/1974, 122,335/1974, 28,834/1975, 132,926/1975, etc.

For the magenta coupler, pyrazolone compounds, pyrazolotriazole compounds, pyrazolinobenzimidazole compounds, indazolone compounds, cyanoacetyl compounds, etc. can be used. Examples of the applicable magenta coupler are given in U.S. Pat. Nos. 2,600,788, 3,061,432, 3,062,653, 3,127,267, 3,311,476, 3,419,391, 3,519,429, 3,558,319, 3,684,514, 3,888,680, British Patent Nos. 1,247,493, 1,534,349, West Germany OLS Patent No. 2,156,111, Belgian Patent Nos. 769,116, 792,525, Japanese Patent Publication No. 60,479/1971, Japanese Patent O.P.I. Publication Nos. 29,639/1974, 111,631/1974, 129,538/1974, 13,041/1975, 122,935/1975, 20,826/1976, 58,533/1977, 80,027/1977, 33,032/1979, 48,539/1979, 48,540/1979, etc.

For the colored magenta coupler that performs as the masking coupler, generally, compounds that are derived from colorless magenta couplers by introducing a substituent arylazo group at the active site of their molecule are used. Examples are compounds given in U.S. Pat. Nos. 2,801,171, 2,983,608, 3,005,712, 3,684,514, British Pat. No. 937,621, Japanese Patent O.P.I. Publication Nos. 123,625/1974; 131,448/1974, etc.

Further, a type of colored magenta couplers that release a dye in the processing bath as a result of a reaction with the oxidation product of a color developing agent as disclosed in U.S. Pat. No. 3,419,391 can also be used.

For the cyan coupler, generally, derivatives of phenol and naphthol are used. Examples of these derivatives are given in U.S. Pat. Nos. 2,423,730, 2,474,293, 2,801,171, 2,895,826, 3,476,563, 3,737,316, 3,758,308, 3,839,044, 3,998,642, Japanese Patent O.P.I. Publication Nos. 37,425/1972, 10,135/1975, 25,228/1975, 112,038/1975, 117,422/1975, 130,441/1975, 21,828/1976, 18,315/1977, 52,423/1978, 105,226/1978, 109,630/1978, etc.

For the colored cyan coupler that performs as the masking coupler, compounds that are derived from colorless cyan couplers by introducing a substituent arylazo group at the active site of their molecule are used. Examles are compounds given in U.S. Pat. Nos. 2,521,908, 3,034,892, British Pat. No. 1,255,111, Japanese Patent O.P.I. Publication No. 22,028/1973, etc.

Further, a type of colored cyan couplers that release a dye in the processing bath as a result of a reaction with the oxidation product of a color developing agent as disclosed in U.S. Pat. No. 3,476,563, Japanese Patent O.P.I. Publication Nos. 10,135/1975, 123,341/1975, etc. can also be used.

In addition, to improve photographic performances, couplers that produce a colorless dye, or so-called "competing couplers" can be included.

Silver halide photographic emulsions used in the present invention are composed of silver chloride, silver bromide, silver chlorobromide, silver iodobromide, or silver chloroiodobromide dispersed in a hydrophilic polymer such as gelatin for the formation of a colloid solution. They can be prepared by various methods.

In the layer or layers containing the DIR compounds of the present invention, which are layers of sensitive silver halide emulsion or the ones of hydrophilic colloid solution adjacent thereto, the combined use of a reducing agent or antioxidant is sometimes preferable to make the DIR compounds of the present invention fully effective. Examples of such reducing agent or antioxidant are sulfites including sodium sulfite and potassium sulfite, bisulfites including sodium bisulfite and potassium bisulfite, hydroxylamine and its derivatives including N-methylhydroxylamine, and N-phenylhydroxylamine, sulfinic acids and their salts including sodium phenylsulfinate, hydrazines including N,N'-dimethylhydrazine, reductones including ascorbic acid, and aromatic hydrocarbons having at least one hydroxyl group including p-aminophenol, gallic acid, catechol, pyrogallol, resorcin, and 2,3-dihydroxynaphthalene.

Beside, to further improve the fastness to light of magenta color images formed by a magenta coupler of the present invention, p-alkoxyphenols or phenolic compounds may be added to the emulsion layer or layers concerned or a layer or layers adjacent thereto.

These emulsion and other layers are formed by coating an adequate base made of laminated paper, cellulose acetate, polystyrene, or the like using a known method.

To load a silver halide photographic material with the DIR compounds of the present invention, they may be added in various phases to the coating solutions for the individual constituent layers to be loaded with these compounds. Here various techniques that have hitherto been used for couplers may be applied.

For example, as disclosed in U.S. Pat. No. 2,322,027, they may be dissolved in a solvent of high boiling point for loading, or as disclosed in U.S. Pat. No. 2,801,170, the coupler and solvent of high boiling point may be separately dispersed in fine particles and then mixed with each other for use.

It is noted that as an alternate approach a coupler with a hydrophilic group or groups and DRI compounds of the present invention can be used in the Fischer's type, namely, by dissolving in alkali solution or the coupler and DRI compounds can be added to one and the same layer by dispersing either the coupler or compounds and applying the former or latter that remain by the method of Fischer's type.

Though the DIR compounds of the present invention are used in different quantities depending on the method, purposes, and expected effects of their application, the total quantity of these compounds combined for use is $10^{-4}$ to $5\times10^{-2}$ mol, and preferably $10^{-3}$ to $10^{-2}$ per mol of emulsified silver halide.

Though the DIR compounds combined may be used also in different proportions depending on the method, purposes, and expected effects of their application, a part of one DIR compound may be combined with 1 to 10 parts of the other.

The color developing solution used in processing the silver halide color photographic material of the present invention is provided in the form of an aqueous alkaline solution of a developing agent whose pH is 8 or more, preferably 9 to 12. Aromatic primary amine developing agents used for the above developing agent are those compounds that have a primary amino group on their benzene ring and are capable of developing silver halide exposed, or their precursor.

Typical of such aromatic primary amine developing agents are p-phenylenediamine compounds.

EXAMPLE 1

A transparent cellulose triacetate film base was coated with a green sensitive silver halide emulsion (6 mol % of silver iodide and 94 mol % of silver bromide) after the emulsion was loaded with one of dispersed mixtures that were prepared by dissolving individual compositions as formulated per mol of silver halide in Table 1 using tricresyl phosphate and ethyl acetate, mixing the resultant solution with 5% gelatin solution, and then milling the mixture in a colloid mill for dispersion. Thus, Samples 1 to 5, each coated to a dry thickness of 3.5μ and loaded with silver 2 g/m² of coating, were prepared.

These Samples 1 to 5 were individually treated in two different keeping conditions as follows:

Condition 1: Individual samples were kept 10 hours in a hermetically sealed container at a temperature and relative humidity of 40° C. and 75% RH inside.

Condition 2: Individual samples were kept 10 hours in a hermetically sealed container, with formaldehyde gas contained at a concentration of $5\times10^{-4}$ mol/l, at a temperature and relative humidity of 40° C. and 75% RH inside.

Individual samples treated in either of the above two conditions were exposed using an intensity scale sensitometer and then processed for the color development according to the following processing schedule:

| Processing schedule (38° C.) | Processing time |
|---|---|
| Color development | 3'15" |
| Bleaching | 6'30" |
| Washing | 3'15" |

TABLE 1

Quantity (mol %) of additives per mol of silver halide

| Compound | Sample No. 1 (ref) | 2 (comp.) | 3 (comp.) | 4 (comp.) | 5 (pres. inv.) |
|---|---|---|---|---|---|
| Coupler* | 5.8 | 5.8 | 5.8 | 5.8 | 5.8 |
| DIR compound D-10 | — | 0.55 | — | — | 0.25 |
| DIR compound D-96 | — | — | 0.70 | 0.70 | 0.40 |
| Dimedone** | — | — | — | 4.5 | — |

*Coupler: 1-(2,4,6-trichlorophenyl)-3-[3-((2,4-di-tert-amylphenoxy)acetamido)benzamido]-5-pyrazolone.

**Dimedone: A compound described in U.S. Pat. No. 3,652,278.

| Processing schedule (38° C.) | Processing time |
|---|---|
| Fixing | 6'30" |
| Washing | 3'15" |
| Stabilization | 1'30" |

The processing solutions at individual processing steps were prepared in the following formulations:

| | |
|---|---|
| Color developing solution: | |
| 4-amino-3-methyl-N—ethyl-N—(3-hydroxyethyl)-aniline sulfate | 4.8 g |
| Anhydrous sodium sulfite | 0.14 g |
| Hydroxylamine bisulfate | 1.98 g |
| Sulfuric acid | 0.74 mg |
| Anhydrous potassium carbonate | 28.85 g |
| Anhydrous potassium bicarbonate | 3.46 g |
| Anhydrous potassium sulfite | 5.10 g |
| Potassium bromide | 1.16 g |
| Sodium chloride | 0.14 g |
| Trisodium nitrilotriacetate (monohydrated) | 1.20 g |
| Potassium hydroxide | 1.48 g |
| Water added to make a solution of 1 liter. | |
| Bleach solution: | |
| Ethylenediaminetetraacetic acid ammonium iron salt | 100.0 g |
| Ethylenediaminetetraacetic acid diammonium salt | 10.0 g |
| Ammonium bromide | 150.0 g |
| Glacial acetic acid | 10.0 g |
| Water added to make a solution of 1 liter and pH adjusted to 6.0 with use of ammonia water. | |
| Fixing solution: | |
| Ammonium thiosulfate | 175.0 g |
| Anhydrous sodium sulfite | 8.6 g |
| Sodium metasulfite | 2.3 g |
| Water added to make a solution of 1 liter and pH adjusted to 6.0 with use of acetic acid. | |
| Stabilization solution: | |
| Formalin (37% aqueous) | 1.5 ml |
| Konidax (supplier: Konishiroku Photo Industry) | 7.5 ml |
| Water added to make a solution of 1 liter. | |

Results thus obtained are given in Table 2, in which sensitivity data are given in relative estimates as compared to the Sample 1 as treated in Condition 1 whose sensitivity was set to 100 while the graininess (rms) was estimated by scanning a colored image of density 0.5 with a microdensitometer whose round scanning aperture was 25μ wide and estimating the standard deviation of density level multiplied by 1000.

It is evidently seen from Table 2 that Samples 2 to 5, when treated in Condition 1, were all equivalent in the DIR effects while among Samples treated in Condition 2 the Sample 3 that contained the compound D-96 from the DIR compound group II was affected very adversely by the contact with formaldehyde gas, showing a remarkably lowered sensitivity, gamma and $D_{max}$.

TABLE 2

| Sample No. | Results of the development: Condition 1 Sens. | Gamma | $D_{max}$ | Grain. (rms) | Condition 2 Sens. | Gamma | $D_{max}$ | Grain. (rms) |
|---|---|---|---|---|---|---|---|---|
| 1 (ref.) | 100 | 1.20 | 2.48 | 68 | 94 | 1.05 | 2.04 | 63 |
| 2 (comp.) | 91 | 0.65 | 1.63 | 36 | 93 | 0.86 | 1.92 | 45 |
| 3 (comp.) | 92 | 0.64 | 1.58 | 33 | 75 | 0.47 | 0.96 | 31 |
| 4 (comp.) | 90 | 0.64 | 1.57 | 33 | 84 | 0.58 | 1.32 | 33 |
| 5 (pres. inv.) | 91 | 0.65 | 1.60 | 34 | 90 | 0.64 | 1.55 | 33 |

Further, the table shows that also in the Sample 4 in which Dimedon, a compound as disclosed in U.S. Pat. No. 3,652,278 was used in combination with the compound D-96, the improving effect of the former was too weak to be satisfactory. On the other hand, the Sample 2 that contained the compound D-10 from the DIR compound group I showed a reversed behavior with the DIR effects seemingly reduced by the contact with formaldehyde gas, again revealing an adverse effect of this gas from the viewpoint of stabilized photographic performances. By contrast, the Sample 5 that was based on the present invention changed only very slightly in photographic performances under contact with formaldehyde gas showing peculiar improvement effects of the invention.

EXAMPLE 2

The same method as in Example 1 was used to emulsify individual compositions as formulated in Table 3 for dispersion and then for addition to a silver halide emulsion of the same composition as used in Example 1. Thus, Samples 6 to 13, each coated to the same dry thickness and loaded with the same quantity of silver as in Example 1, were prepared.

These Samples 6 to 13 were individually treated in the same two keeping conditions as described in Example 1, exposed using an intensity scale sensitometer and then processed for the color development according to the processing schedule as in the same Example.

Results thus obtained are given in Table 4, in which sensitivity data are given in relative estimates as compared to the Sample 6 treated in Condition 1 whose sensitivity was set to 100 while the graininess was determined by the same method as used in Example 1.

It is evidently seen from Table 4 that Samples 7 to 13, when treated in Condition 1, were all equivalent in the DIR effects and that when these samples were treated in Condition 2 Samples 7 and 8 that were not based on the present invention were adversely affected by the contact with formaldehyde gas, showing changes in their photographic performances while by contrast Samples 9 to 13 that were based on the present invention changed only very slightly in photographic performances under contact with formaldehyde gas showing peculiar improvement effects of the invention.

TABLE 3

| Compound | Quantity (mol %) of additives per mol of silver halide — Sample No. 6 (ref.) | 7 (comp.) | 8 (comp.) | 9 (pres. inv.) | 10 (pres. inv.) | 11 (pres. inv.) | 12 (pres. inv.) | 13 (pres. inv.) |
|---|---|---|---|---|---|---|---|---|
| Coupler* | 2.9 | 2.9 | 2.9 | 2.9 | 2.9 | 2.9 | 2.9 | 2.9 |
| DIR compound D-40 | — | 0.50 | — | 0.35 | 0.35 | — | — | 0.20 |
| DIR compound D-44 | — | 0.20 | — | — | — | 0.12 | 0.12 | 0.08 |
| DIR compound D-129 | — | — | 0.45 | 0.18 | — | 0.20 | — | 0.18 |
| DIR compound D-141 | — | — | 0.35 | — | 0.14 | — | 0.16 | — |

*Coupler: 4,4'-methylenebis-1-(2,4,6-trichlorophenyl)-3-[3-{(2,4-di-tert-amylphenoxy)acetamido}benzamido]-5-pyrazolone.

TABLE 4

| Sample No. | Results of the development: Condition 1 Sens. | Gamma | $D_{max}$ | Grain. (rms) | Condition 2 Sens. | Gamma | $D_{max}$ | Grain. (rms) |
|---|---|---|---|---|---|---|---|---|
| 6 (ref.) | 100 | 1.36 | 2.93 | 65 | 95 | 1.15 | 2.42 | 63 |
| 7 (comp.) | 92 | 0.77 | 1.86 | 40 | 93 | 0.95 | 2.18 | 48 |
| 8 (comp.) | 90 | 0.72 | 1.78 | 41 | 72 | 0.53 | 1.16 | 37 |
| 9 (pres. inv.) | 90 | 0.75 | 1.84 | 41 | 89 | 0.74 | 1.78 | 40 |
| 10 (pres. inv.) | 91 | 0.74 | 1.80 | 38 | 90 | 0.72 | 1.70 | 38 |
| 11 (pres. inv.) | 90 | 0.72 | 1.76 | 40 | 90 | 0.71 | 1.72 | 39 |
| 12 (pres. inv.) | 91 | 0.75 | 1.84 | 39 | 89 | 0.73 | 1.79 | 38 |

TABLE 4-continued

| Sample No. | Results of the development | | | | | | | |
|---|---|---|---|---|---|---|---|---|
| | Condition 1 | | | | Condition 2 | | | |
| | Sens. | Gamma | $D_{max}$ | Grain. (rms) | Sens. | Gamma | $D_{max}$ | Grain. (rms) |
| 13 (pres. inv.) | 92 | 0.72 | 1.78 | 41 | 91 | 0.73 | 1.82 | 40 |

Further, Sample 13 indicated clearly that the combination of three DIR compounds, D-40 and D-44 from the DIR compound group I and D-129 from DIR compound group II gives favorable improving effects without impairing the photographic performances at all.

EXAMPLE 3

A transparent cellulose triacetate film base was coated with the following layers in the order of description to prepare a multi-layer color photographic material Sample 14:

First layer—antihalation coating

Gelatin layer containing black colloidal silver (1μ in dry thickness).

Second layer—intermediate layer

Gelatin layer (1μ in dry thickness)

Third layer—layer of red-sensitive emulsion

Layer of red-sensitive silver iodobromide emulsion containing $6.8\times10^{-2}$ mol of 1-hydroxy-4-methoxyethylaminocarbonylmethoxy-N-[δ-(2,4-di-tert-amylphenoxy)butyl]-2-naphthamide as cyan coupler, $1.7\times10^{-2}$ mol of 1-hydroxy-4-(2-ethoxycarbonylphenylazo)-N-[δ-(2,4-di-tert-amylphenoxy)butyl]-2-naphthamide as colored coupler, and $4\times10^{-3}$ mol of DIR compound D-151 per mol of silver halide (8 mol % of silver iodide and 92 mol % of silver bromide, silver 3.5 g/m$^2$ of coated layer, and 4.5μ in dry thickness).

Fourth layer—intermediate layer

Gelatin layer containing 2,5-di-tert-octylhydroquinone 3.5 g/20 g of gelatin (1μ in dry thickness)

Fifth layer—Layer of green-sensitive emulsion

Layer of green-sensitive silver iodobromide emulsion containing $5.8\times10^{31\ 2}$ mol of 1-(2,4,6-trichlorophenyl)-3-[3-(2,4-di-tert-amylphenoxyacetamido)benzamido]-5-pyrazolone as magenta coupler, $1.7\times10^{-2}$ mol of 1-(2,4,6-trichlorophenyl)-3-(2-chloro-5-octadecenylsuccinimido)anilino-4-(4-hydroxyphenylazo)-5-pyrazolone as colored coupler, and $7\times10^{-3}$ mol of DIR compound D-125 per mol of silver halide (8 mol % of silver iodide and 92 mol % of silver bromide, silver 2.5 g/m$^2$ of coated layer, and 4μ in dry thickness).

Sixth layer—intermediate layer

Same as the fourth layer.

Seventh layer—Yellow filter layer

Gelatin layer containing yellow colloidal silver (1μ in dry thickness).

Eighth layer—layer of blue-sensitive emulsion

Layer of blue-sensitive silver iodobromide emulsion containing $1.5\times10^{-1}$ mol of α-pivaloyl-α-(3,5-dioxo-1,2-diphenyl-imidazolidin-4-yl)-2-chloro-5-[γ-(2,4-di-tert-amylphenoxy)butylamido]-acetanilide as yellow coupler per mol of silver halide (7 mol % of silver iodide and 93 mol % of silver bromide, silver 1.2 g/m$^2$ of coated layer, and 3μ in dry thickness).

Ninth layer—protective layer

Gelatin layer (1μ in dry thickness)

Sample 15 was prepared by the same method as applied to Sample 14 but for the use of $5\times10^{-3}$ mol of DIR compound D-78 instead of $7\times10^{-3}$ mol of DIR compound D-125 in the fifth layer.

Sample 16 was prepared by the same method as applied to Sample 14 but for the use of $3\times10^{-3}$ mol of DIR compound D-78 and $3\times10^{-3}$ mol of DIR compound D-125 instead of $7\times10^{-3}$ mol of DIR compound D-125 in the fifth layer.

Sample 17 was prepared by the same method as applied to Sample 14 but for the use of 2.4 mol of DIR compound D-78 and $4\times10^{-3}$ mol of DIR compound D-125 instead of $7\times10^{-3}$ mol of DIR compound D-125.

These Samples 14 to 17 were individually treated in the same two keeping conditions as described in Example 1, exposed using an intensity scale sensitometer and then processed for the color development according to the processing schedule as in the same Example.

These samples were all equivalent in their photographic performances when treated in Condition 1. When treated in Condition 2, they deteriorated only to a minor degree showing almost an equivalent drop in sensitivity, gamma and color development as far as the red- and blue-sensitive layers were concerned. As for the green-sensitive layer, however, they performed differently from one another. Namely, in Sample 14, the sensitivity, gamma and color development were considerably lowered in this layer than in other two sensitive layers, resulting in a considerable loss of the color balance, while Sample 15 showed a behavior quite opposed to Sample 14 though there was also a considerable loss of the color balance.

By contrast, with Sample 16 whose fifth layer contained a combination of DIR compounds according to the present invention, the green-sensitive layer after the treatment in Condition 2 was almost equivalent in photographic performances to the one after the treatment in Condition 1, indicating no deterioration of this layer, though the color balance of this layer with the other two sensitive layers were still slightly lost. The same combination of DIR compounds as in Sample 16 was used but in a different proportion in Sample 17, with which the green-sensitive layer showed a slight drop in the sensitive, gamma and color development after the treatment in Condition 2 but this deterioration was almost equivalent in degree to the one in the red- and blue-sensitive layers, so the color balance was kept between the three sensitive layers.

It is thus found that the present invention gives an effective means in controlling changes in photographic performances of the multi-layer silver halide color photographic material caused by an additive DIR compound or compounds under contact with formaldehyde gas so as to keep the color balance even in such unfavorable condition.

EXAMPLE 4

A transparent cellulose triacetate film base was coated with the following layers in the order of description to prepare multi-layer color negative photographic material Sample 18 to 21 containing DIR compounds as shown in Table 5:

TABLE 5

| | Quantity (mol %) of DIR compounds added per mol of silver halide | | | | |
|---|---|---|---|---|---|
| | | Sample No. | | | |
| Layer | DIR compound | 18 | 19 | 20 | 21 |
| Third | D-2 | — | 0.33 | 0.33 | 0.33 |
| | D-90 | 0.95 | 0.63 | 0.63 | 0.63 |
| Fourth | D-2 | — | 0.17 | 0.17 | 0.17 |
| | D-90 | 0.50 | 0.33 | 0.33 | 0.33 |
| Sixth | D-68 | 0.25 | — | 0.25 | 0.25 |
| | D-108 | 0.52 | 0.85 | 0.52 | 0.52 |
| Seventh | D-68 | 0.14 | 0 | 0.14 | 0.14 |
| | D-108 | 0.27 | 0.45 | 0.27 | 0.27 |
| Tenth | D-18 | 0.35 | 0.35 | — | 0.35 |
| | D-108 | 0.43 | 0.43 | 0.70 | 0.43 |
| Eleventh | D-18 | 0.14 | 0.14 | — | 0.14 |
| | D-108 | 0.18 | 0.18 | 0.30 | 0.18 |

First layer—antihalation coating

An aqueous gelatin solution containing black colloidal silver was applied to form a coating of 3.0μ in dry thickness containing silver 0.3 g/m$^2$ of coating.

Second layer—intermediate layer

An aqueous gelatin solution was applied to form a coating of 1.0μ in dry thickness.

Third layer—layer of red-sensitive slow silver halide emulsion

A silver iodobromide emulsion, which was prepared by mixing two silver iodobromide emulsions, one having a mean grain size of 0.6μ and containing 4 mol % of silver iodide and the other having a mean grain size of 0.3μ and containing 4 mol % of silver iodide, at a ratio of 2:1, was chemically sensitized using gold and sulfur sensitizers, to which two red-sensitive sensitizing dyes anhydrous 9-ethyl-3,3'-di-(3-sulfopropyl)-4,5,4',5'-dibenzothiacarbocyanine hydroxide and anhydrous 5,5'-dichloro-9-ethyl-3,3'-di-(3-sulfopropyl)thiacarbocyanine hydroxide were added. Further, 1.0 g of 4-hydroxy-6-methyl-1,3,3a,7-tetrazaindene and 20.0 mg of 1-phenyl-5-mercaptotetrazole were added to the mixture to prepare a red-sensitive slow emulsion. 59 g of 1-hydroxy-N-[δ-(2,4-di-tert-amylphenoxy-butyl]-2-naphthamide as cyan coupler, 4 g of 1-hydroxy-4-[4-(1-hydroxy-8-acetamido-3,6-disulfo-2-naphthylazo)-phenoxy]-N-[δ-(2,4-di-tert-amylphenoxy)butyl]-2-naphthamide disodium salt as colored cyan couplers and 0.5 g of dodecylgallate and DIR compounds in quantities as specified in Table 5 per mol of silver halide were dissolved in 65 g of tricresyl phosphate and 136 ml of ethyl acetate by heating, and the solution was added to 550 ml of 5.7% aqueous gelatin solution containing 5 g of sodium triisopropylnaphthalenesulfonate for emulsification and dispersion by means of a colloid mill. After dispersion, the mixture was added to the above emulsion to prepare the final red-sensitive slow emulsion, which was used to form a coating of 4.0μ in dry thickness containing 160 g of gelatin per mol of silver halide.

Fourth layer—layer of red-sensitive fast silver halide emulsion

A silver iodobromide emulsion having a mean grain size of 1.2μ and containing 7 mol % of silver iodide was chemically sensitized using gold and sulfur sensitizers. Further, the emulsion was loaded with anhydrous 9-ethyl-3,3'-di-(3-sulfopropyl)-4,5,4',5'-dibenzothiacarbocyanine hydroxide and anhydrous 5,5'-dichloro-9-ethyl-3,3'-di-(3-sulfopropyl)thiacarbocyanine hydroxide as red-sensitive dyes and then with 1.0 g of 4-hydroxy-6-methyl-1,3,3a,7-tetrazaindene and 10.0 mg of 1-phenyl-5-mercaptotetrazole to prepare a red-sensitive fast emulsion. 15 g of 1-hydroxy-4-isopropylaminocarbonylmethoxy-N-dodecyl-2-naphthamide as cyan coupler, 4 g of 1-hydroxy-4-[4-(1-hydroxy-8-acetamido-3,6-disulfo-2-naphthylazo)phenoxy]-N-[δ-(2,4-di-tert-amylphenoxy)butyl]-2-naphthamide disodium salt as colored cyan couplers and 0.5 g of dodecyl gallate per mol of silver halide, and DIR compounds in quantities as specified in Table 5 were dissolved in 20 g of tricresylphosphate and 60 ml of ethyl acetate by heating, and the solution was added to 300 ml of 7.5% aqueous gelatin solution containing 1.5 g of sodium triisopropylnaphthalenesulfonate for emulsification and dispersion by means of a colloid mill. After dispersion, the mixture was added to the above emulsion to prepare the final red-sensitive fast emulsion, which was used to form a coating of 2.0μ in dry thickness containing 160 g of gelatin per mol of silver halide.

Fifth layer—intermediate layer

Same as the second layer.

Sixth layer—layer of green-sensitive slow silver halide emulsion.

Two silver iodobromide emulsions, one having a mean grain size of 0.6μ and containing 4 mol % of silver iodide and the other having a mean grain zie of 0.3μ and containing 7 mol % of silver iodide, were individually chemically sensitized using gold and sulfur sensitizers and then loaded with anhydrous 5,5'-dichloro-9-ethyl-3,3'-di-(3-sulfopropyl)oxacarbocyanine hydroxide and anhydrous 5,5'-diphenyl-9-ethyl-3,3'-di-(3-sulfopropyl-)oxacarbocyanine hydroxide and anhydrous 9-ethyl-3,3'-di-(3-sulfopropyl)-5,6,5',6'-dibenzoxacarbocyanine hydroxide as green-sensitive sensitizing dyes, and then with 1.0 g of 4-hydroxy-6-methyl-1,3,3a,7-tetrazaindene and 20.0 mg of 1-phenyl-5-mercaptotetrazole according to the ordinary method of preparation. Two silver halide emulsions thus obtained were mixed in a proportion of 1:1 to prepare a green-sensitive slow silver halide emulsion.

54 g of 1-(2,4,6-trichlorophenyl)-3-[3-(2,4-di-tert-amylphenoxyacetamido)benzamido]-5-pyrazolone and 22 g of 4,4'-methylenebis{1-(2,4,6-trichlorophenyl)-3-[3-(2,4-di-t-amylphenoxyacetamido)benzamido]-5-pyrazolone} as magenta couplers, 2.5 g of 1-(2,4,6-trichlorophenyl)-4-(1-naphthylazo)-3-(2-chloro-5-octadecenylsuccinimidoanilino)-5-pyrazolone as colored magenta couplers and 0.5 g of dodecyl gallate per mol of silver halide, and DIR compounds in quantities as specified in Table 5 were dissolved in 120 g of tricresyl phosphate and 240 ml of ethyl acetate by heating, and the solution was added to an aqueous gelatin solution containing sodium triisopropylnaphthalenesulfonate for emulsification and dispersion by means of a colloid mill. After dispersion, the mixture was added to the above emulsion to prepare the final green-sensitive slow emulsion, which was used to form a coating of 4.0μ in dry thickness containing 160 g of gelatin per mol of silver halide.

Seventh layer—Layer of green-sensitive fast halide emulsion

A silver iodobromide emulsion having a mean grain size of 1.2μ and containing 7 mol % of silver iodide was chemically sensitized using gold and sulfur sensitizers and loaded with anhydrous 5,5'-dichloro-9-ethyl-3,3'-di-(3-sulfopropyl)oxacarbocyanine hydroxide, anhydrous 5,5'-diphenyl-9-ethyl-3,3'-di-(3-sulfopropyl)oxacarbocyanine hydroxide and anhydrous 9-ethyl-3,3'- di-(3-sulfopropyl)-5,6,5',6'-dibenzoxacarbocyanine hydroxide as green-sensitive sensitizing dyes and with 1.0 g of 4-hydroxy-6-methyl-1,3,3a,7-tetrazaindene and 10.0 mg of 1-phenyl-5-mercaptotetrazole to prepare a green-sensitive fast silver halide emulsion. 54 g of 1-(2,4,6-trichlorophenyl-3-[3-(2,4-di-tert-amylphenoxyacetamido)-benzamido]-5-pyrazolone and 22 g of 4,4'-methylenebis{1-(2,4,6-trichlorophenyl)-3-[3-(2,4-di-tert-amylphenoxyacetamido]-5-pyrazolone} as magenta couplers, 2.5 g of 1-(2,4,6-trichlorophenyl)-4-(1-naphthylazo)-3-(2-chloro-5-octadecenylsuccinimidoanilino)-5-pyrazolone as colored magenta couplers and 0.5 g of dodecyl gallate per mol of silver halide, and DIR compounds in quantities as specified in Table 5 were dissolved in 120 g of tricresyl phosphate and 240 ml of ethyl acetate by heating and the solution was added to an aqueous gelatin solution containing sodium triisopropylnaphthalenesulfonate for emulsification and dispersion by means of a colloid mill. After dispersion, the mixture was added to the above emulsion to prepare the final green-sensitive fast emulsion, which was used to form a coating of 2.0μ in dry thickness containing 160 g per mol of silver halide.

Eighth layer—intermediate layer

Same as the second layer.

Ninth layer—yellow filter layer 3 g of 2,5-di-tert-octylhydroquinone and 1.5 g of di-2-ethylhexyl phthalate were dissolved in 10 ml of ethyl acetate and the solution was dispersed in an aqueous gelatin solution containing 0.3 g of sodium triiospropylnaphthalenesulfonate. After dispersion, the mixture was added to another gelatin solution in which yellow colloidal silver was dispersed. The resultant solution was used to form a coating of 1.2μ in dry thickness containing gelatin 0.9 g/m$^2$ and 2,5-di-tert-octylhydroquinone 0.10 g/m$^2$ of coating.

Tenth layer—layer of blue-sensitive slow silver halide emulsion

A silver iodobromide emulsion having a mean grain size of 0.6μ and containing 6 mol % of silver iodide was chemically sensitized using gold and sulfur sensitizers and loaded with anhydrous 3,3'-di(3-sulfopropyl)-4,5,4',5'-dibenzothiacyanine hydroxide as sensitizing dye and then with 1.0 g of 4-hydroxy-6-methyl-1,3,3a,7-tetrazaindene and 20.0 mg of 1-phenyl-5-mercaptotetrazole, according to the ordinary method of preparation to prepare a blue-sensitive slow silver halide emulsion 120 g of α-pivaloyl-α-(1-benzyl-2-phenyl-3,5-dioxo-1,2,4-triazolidin-4-yl)-2'-chloro-5'-[α-(dodecyloxycarbonyl)ethoxycarbonyl]acetanilide as yellow coupler per mol of silver halide and DIR compounds in quantities as specified in Table 5 were dissolved in 120 g of dibutyl phthalate and 300 ml of ethyl acetate by heating and the solution was added to an aqueous gelatin solution containing sodium triisopropylnaphthalenesulfonate for emulsification and dispersion by means of a colloid mill. After dispersion, the mixture was added to the above emulsion to prepare the final blue-sensitive slow silver halide emulsion, which was used to form a coating of 4.0μ in dry thickness containing gelatin 160 g per mol of silver halide.

Eleventh layer—layer of blue-sensitive fast silver halide emulsion

A silver iodobromide emulsion having a mean grain size of 1.2μ and containing 7 mol % of silver iodide was chemically sensitized using gold and sulfur sensitizers, and loaded with anhydrous 3,3'-di-(3-sulfopropyl)-4,5,4',5'-dibenzothiacyanine hydroxide as sensitizing dye and then with 1.0 g of 4-hydroxy-6-methyl-1,3,3a,7-tetrazaindene and 10.0 mg of 1-phenyl-5-mercaptotetrazole according to the ordinary method of preparation to prepare a blue-sensitive fast silver halide emulsion. 80 g of α-pivaloyl-α-(1-benzyl-2-phenyl-3,5-dioxo-1,2,4-triazolidin-4-yl)-2'-chloro-5'-[α-(dodecyloxycarbonyl-)ethoxycarbonyl]acetanilide as yellow coupler per mol of silver halide and DIR compounds in quantity as specified in Table 5 were dissolved in 80 g of dibutyl phthalate and 240 ml of ethyl acetate by heating and the solution was added to an aqueous gelatin solution containing sodium triisopropylnaphthalenesulfonate for emulsification and dispersion by means of a colloid mill. The mixture was added to the above emulsion to prepare the final blue-sensitive fast silver halide emulsion, which was used to form a coating of 2.0μ in dry thickness containing 240 g of gelatin per mol of silver halide.

Twelfth layer—intermediate layer 24 g of di-2-ethylhexyl phthalate was dissolved in 12 ml of ethyl acetate and the solution was dispersed in an aqueous gelatin sodium containing 0.6 g of sodium triisopropylnaphthalenesulfonate. The mixture was used to form a coating of 1.0μ in dry thickness containing gelatin 1.0 g/m$^2$ of coating.

Thirteenth layer—protective layer

An aqueous solution containing 4 g of gelatin and 0.2 g of 1,2-bisvinylsulfonylethane per 100 ml was used to form a coating of 1.2μ in dry thickness containing gelatin 1.3 g/m$^2$ of coating.

Samples 18 to 21 thus obtained were individually treated in the same two keeping conditions as described in Example 1, exposed using an intensity scale sensitometer and then processed for the color development according to the processing schedule as in the same Example.

The results showed that when treated in Condition 1 these Samples were all equivalent in their photographic performances while when treated in Condition 2 Samples 18, 19 and 20 showed a poorer color development for cyan, magenta and yellow, respectively, the color balance being lost by the contact with formalin gas.

By contrast, Sample 21 in which DIR compounds were combined according to the present invention in the sensitive emulsion layers maintained the color balance even after the treatment in Condition 2, showing photographic performances almost equivalent to those observed after the treatment in Condition 1.

What is claimed is:

1. A color photographic material having a light-sensitive silver halide emulsion layer coated on a support, which comprises (1) a DIR compound which releases a diffusive development-inhibiting substance, said substance having an amino group, by a coupling reaction with an oxidation product of an aromatic primary amine developing agent (DIR compound (I)) and (2) a DIR compound which releases a diffusive development-inhibiting substance, said substance having no amino group, by a coupling reaction with an oxidation product of an aromatic primary amine developing agent (DIR compound (II)).

2. A color photographic material according to claim 1 wherein the DIR compound (I) and DIR compound (II) are those described by the formula (I) and (II) respectively:

$$C_p\text{-}Z_1 \qquad (I)$$

$C_p$-$Z_1$ (II), wherein the formulae $C_p$ is a coupler residue, being capable of coupling with an oxidation product of an aromatic primary amine developing agent, $Z_1$ is a residue which is released to be a diffusive development-inhibiting substance having an amino group, by coupling reaction with the oxidation product of the aromatic primary amine developing agent, $Z_2$ is a residue which is released to be a diffusive development-inhibiting substance having no amino group, by coupling reaction with the oxidation product of the aromatic primary amine developing agent.

3. A color photographic material according to claim 2 wherein $Z_1$ is represented by

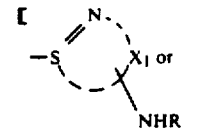

(III)

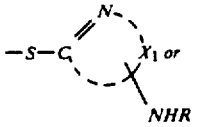

(III)

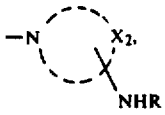

(IV)

and $Z_2$ is represented by

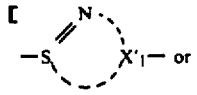

(V)

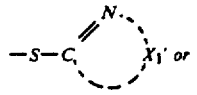

(V)

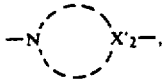

(VI)

wherein $X_1$ is a 5 or 6 membered heterocycle containing a nitrogen, oxygen or sulfur, and having no amino group other than that described in the formula (III), $X_1'$ is a 5 or 6 membered heterocycle containing a nitrogen, oxygen or sulfur and having no amino group, $X_2$ is a 5 membered heterocycle containing two nitrogen atoms and having no amino group other than that described in the formula (IV), $X_2'$ is a 5 membered heterocycle containing two nitrogen atoms and having no amino group, and R is hydrogen, alkyl, aryl or heterocycle.

4. A color photographic material according to claim 3 wherein R is hydrogen.

5. A color photographic material according to claim 3 wherein $Z_1$ is represented by

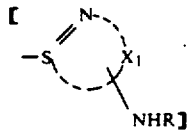

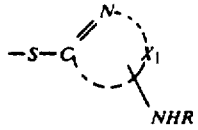

(III)

wherein $X_1$ and R have same meanings as defined in claim 3.

6. A color photographic material according to claim 3 wherein $Z_1$ and $Z_2$ are represented by

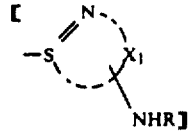

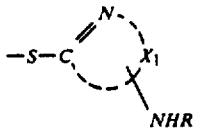

(III)

and

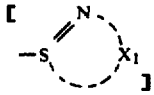

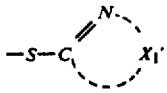

(V)

respectively [, wherein $X_1$ and R have same meanings as defined in claim 3].

* * * * *